US010926794B2

(12) United States Patent
Murayama et al.

(10) Patent No.: US 10,926,794 B2
(45) Date of Patent: Feb. 23, 2021

(54) VEHICULAR BEHAVIOR CONTROL APPARATUS

(71) Applicant: TOYOTA JIDOSHA KABUSHIKI KAISHA, Toyota (JP)

(72) Inventors: Takemi Murayama, Mishima (JP); Hisanori Mitsumoto, Hadano (JP); Takuya Shoji, Susono (JP); Noritsugu Iwazaki, Sunto-gun (JP); Go Inoue, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/173,097

(22) Filed: Oct. 29, 2018

(65) Prior Publication Data

US 2019/0126976 A1 May 2, 2019

(30) Foreign Application Priority Data

Oct. 30, 2017 (JP) .............................. JP2017-209218

(51) Int. Cl.
*B62D 6/00* (2006.01)
*B60W 40/114* (2012.01)
(Continued)

(52) U.S. Cl.
CPC ............ *B62D 6/005* (2013.01); *B60T 8/1755* (2013.01); *B60T 8/17555* (2013.01);
(Continued)

(58) Field of Classification Search
CPC . B60W 2040/1346; B60W 2050/0017; B60W 10/18; B60W 10/184; B60W 10/20;
(Continued)

(56) References Cited

U.S. PATENT DOCUMENTS 5,576,959 A * 11/1996 Hrovat .................... B60T 8/172
180/197
6,155,655 A * 12/2000 Matsuno ............... B60T 8/1755
303/140
(Continued)

FOREIGN PATENT DOCUMENTS

JP 2009-541633 A 11/2009
JP 2013-241063 A 12/2013

*Primary Examiner* — Atul Trivedi
(74) *Attorney, Agent, or Firm* — Sughrue Mion, PLLC

(57) ABSTRACT

A vehicular behavior control apparatus in which a control unit that controls a driving device and a braking device is configured to calculate a target yaw moment and a target deceleration of the vehicle for ensuring stable behavior of the vehicle during non-braking turning, to calculate a first vehicle longitudinal force applied to a turning inner wheel to achieve the target yaw moment and a second vehicle longitudinal force necessary to achieve the target deceleration, to control, when the first vehicle longitudinal force is equal to or less than the second vehicle longitudinal force, the driving device so as to generate a driving force equal to a value obtained by subtracting the second vehicle longitudinal force from a driver-requested driving force and adding the first vehicle longitudinal force, and to apply the first vehicle longitudinal force to the turning inner wheel.

6 Claims, 6 Drawing Sheets

(51) Int. Cl.
*B60T 8/1755* (2006.01)
*B60W 40/13* (2012.01)
*B60W 50/00* (2006.01)
*B60W 10/18* (2012.01)
*B60W 10/20* (2006.01)

(52) U.S. Cl.
CPC ........... *B60W 40/114* (2013.01); *B62D 6/003* (2013.01); *B60T 2201/16* (2013.01); *B60W 10/18* (2013.01); *B60W 10/20* (2013.01); *B60W 40/13* (2013.01); *B60W 2040/1346* (2013.01); *B60W 2050/0017* (2013.01); *B60W 2400/00* (2013.01); *B60W 2720/14* (2013.01)

(58) Field of Classification Search
CPC ........... B60W 30/02; B60W 30/18145; B60W 40/114; B60W 40/13; B60W 2400/00; B60W 2720/14; B60T 8/1755; B60T 8/17555; B60T 2201/16; B62D 6/003; B62D 6/005
USPC ........................................................ 701/41
See application file for complete search history.

(56) References Cited

U.S. PATENT DOCUMENTS

| | | | | |
|---|---|---|---|---|
| 6,409,287 B1* | 6/2002 | Leach | ................ | B60T 7/12 |
| | | | | 303/146 |
| 10,737,688 B2* | 8/2020 | Mitsumoto | ........... | B60T 8/1755 |
| 2004/0262991 A1* | 12/2004 | Anwar | ................ | B60T 8/1755 |
| | | | | 303/147 |
| 2005/0236894 A1* | 10/2005 | Lu | ................ | B60W 10/20 |
| | | | | 303/139 |
| 2008/0059021 A1* | 3/2008 | Lu | ................ | B60G 17/0195 |
| | | | | 701/36 |
| 2008/0059034 A1* | 3/2008 | Lu | ................ | B60T 8/17552 |
| | | | | 701/71 |
| 2008/0086248 A1* | 4/2008 | Lu | ................ | B60T 8/171 |
| | | | | 701/41 |
| 2008/0086251 A1* | 4/2008 | Lu | ................ | B60T 8/1755 |
| | | | | 701/70 |
| 2008/0294313 A1* | 11/2008 | Aoki | ................ | B62D 6/006 |
| | | | | 701/43 |
| 2009/0271073 A1* | 10/2009 | Lu | ................ | B60T 8/1755 |
| | | | | 701/41 |
| 2009/0271074 A1* | 10/2009 | Hulten | ................ | B62D 6/003 |
| | | | | 701/42 |
| 2010/0056338 A1 | 3/2010 | Erban | | |
| 2011/0125368 A1* | 5/2011 | Yokota | ................ | B60T 8/17554 |
| | | | | 701/41 |
| 2011/0218700 A1* | 9/2011 | Mori | ................ | B60W 10/20 |
| | | | | 701/31.4 |
| 2013/0013151 A1 | 1/2013 | Schafiyha et al. | | |
| 2013/0103279 A1* | 4/2013 | Asano | ................ | B60T 8/1755 |
| | | | | 701/72 |
| 2013/0144476 A1* | 6/2013 | Pinto | ................ | B60T 8/17555 |
| | | | | 701/22 |
| 2013/0253793 A1* | 9/2013 | Lee | ................ | B62D 9/005 |
| | | | | 701/70 |
| 2016/0318509 A1 | 11/2016 | Rycroft | | |
| 2017/0008422 A1* | 1/2017 | Honda | ................ | B60W 30/045 |
| 2017/0057540 A1* | 3/2017 | Anma | ................ | B62D 6/003 |
| 2017/0137023 A1* | 5/2017 | Anderson | ................ | B60W 50/14 |
| 2017/0305416 A1* | 10/2017 | Yamakado | ................ | B60T 7/12 |
| 2018/0141547 A1* | 5/2018 | Fujiki | ................ | G05D 1/02 |
| 2018/0208184 A1* | 7/2018 | Sugai | ................ | B60W 30/1819 |
| 2020/0156607 A1* | 5/2020 | Ueno | ................ | B60W 40/068 |
| 2020/0290578 A1* | 9/2020 | Terasaka | ................ | B60T 8/1764 |

* cited by examiner

VEHICULAR BEHAVIOR CONTROL APPARATUS

CROSS-REFERENCE TO RELATED APPLICATION

The disclosure of Japanese Patent Application NO. JP2017-209218 filed on Oct. 30, 2017 is incorporated by reference in its entirety.

BACKGROUND

1. Technical Field

The present disclosure relates to a behavior control apparatus for a vehicle such as an automobile.

2. Description of the Related Art

A behavior control apparatus that performs behavior control for stabilizing turning behavior of a vehicle by controlling braking/driving force of each wheel in a vehicle such as an automobile when stability of the vehicle decreases during turning is well known. For example, Japanese Patent Application Laid-open Publication No. 2013-241063 discloses a behavior control apparatus configured to calculate a target yaw moment and a target deceleration of a vehicle for stabilizing turning behavior of the vehicle by reducing a deviation between a normative yaw rate of the vehicle and an actual yaw rate of the vehicle based on the deviation between the yaw rates, and to control a braking force of each wheel so that the target yaw moment and the target deceleration can be achieved.

When a vehicle is in an understeer state, a magnitude of an actual yaw rate becomes smaller than a magnitude of a normative yaw rate. Therefore, in a conventional behavior control apparatus as described in the above publication, when a magnitude of a yaw rate deviation becomes equal to or larger than a reference value, a braking force is applied to a turning inner wheel so that a target yaw moment is achieved, and braking forces are applied to the left and right wheels so that a target deceleration is achieved.

When a braking force is applied to a turning inner wheel and a driving force having the same magnitude as the braking force is added to a turning outer wheel so as to achieve the target yaw moment during the vehicle is not braked, no braking force is given to the vehicle and the vehicle does not decelerate. However, in a conventional behavior control apparatus as described in the publication, a braking force is applied to the turning inner wheel, but a driving force having the same magnitude as the braking force is not added to the turning outer wheel. As a result, it is inevitable that the vehicle decelerates unnecessarily due to the application of the braking force to the turning inner wheel, so that an occupant or occupants of the vehicle may feel discomfortable.

Incidentally, when a braking force is applied to a turning inner wheel and a driving force having the same magnitude as the braking force is added to a turning outer wheel, the vehicle can be prevented from unnecessarily decelerating and an occupant or occupants of the vehicle can be prevented from feeling discomfortable. However, in that case, it is inevitable that fuel consumption is deteriorated due to the addition of the driving force, and a device for variably controlling the lateral distribution of a driving force generated by a driving device is necessary.

SUMMARY

The present disclosure provides a vehicular behavior control apparatus which is improved to control behavior of the vehicle during non-braking turning without imparting unnecessary braking force to the vehicle, thereby preventing unnecessary deceleration of the vehicle and reducing a possibility that an occupant of the vehicle feels uncomfortable due to the unnecessary deceleration of the vehicle.

According to the present disclosure, a vehicular behavior control apparatus is provided which is configured to control behavior of a vehicle having a driving device that generates a driving force for driving the vehicle, a braking device that generates a braking force applied to each wheel, and a control unit that controls the driving device based on a driving operation amount of a driver and controls the braking device based on a braking operation amount of the driver.

The control unit is configured to calculate a target yaw moment of the vehicle and a target deceleration of the vehicle that are necessary for securing stable behavior of the vehicle during non-braking turning, to calculate a first vehicle longitudinal force generated by a braking force applied to at least one of the turning inner front and rear wheels to achieve the target yaw moment, to calculate a second vehicle longitudinal force required to achieve the target deceleration, to control, when the first vehicle longitudinal force is equal to or less than the second vehicle longitudinal force, the driving device so as to generate a target driving force equal to a value obtained by adding a correction amount based on the first vehicle longitudinal force to a value obtained by subtracting the second vehicle longitudinal force from a driving force based on the driving operation amount of the driver, and to control the braking device so that a target braking force equal to the first vehicle longitudinal force is applied to at least one of the turning inner front and rear wheels.

According to the above configuration, when the first vehicle longitudinal force is equal to or less than the second vehicle longitudinal force, the driving device is controlled so as to generate a target driving force equal to a value obtained by adding a correction amount based on the first vehicle longitudinal force to a value obtained by subtracting the second vehicle longitudinal force from a driving force based on the driving operation amount of the driver. In addition, the braking device is controlled so that a target braking force equal to the first vehicle longitudinal force is applied to at least one of the turning inner front and rear wheels. Therefore, as will be described in detail later, a driving force of the entire vehicle is a value obtained by subtracting the second vehicle longitudinal force from the driving force based on the driving operation amount of the driver.

In contrast, a driving force of the entire vehicle in which a behavior control by a conventional behavior control apparatus is performed is a value obtained by subtracting the first vehicle longitudinal force and the second vehicle longitudinal force from the driving force based on the driving operation amount of the driver.

Thus, according to the above configuration, the driving force of the entire vehicle can be increased by the first vehicle longitudinal force. Therefore, as compared to the conventional behavior control apparatus, a reduction amount of the driving force of the entire vehicle due to the behavior control can be reduced, so that unnecessary deceleration of the vehicle can be prevented and the possibility that an occupant or occupants of the vehicle may feel uncomfortable due to deceleration can be reduced.

It is to be noted that the first and second vehicle longitudinal forces are forces acting in a direction opposite to the driving force to decelerate the vehicle, that is, braking forces.

In one aspect of the present disclosure, the control unit is configured to control, when the first vehicle longitudinal force is greater than the second vehicle longitudinal force, the driving device so as to generate a driving force based on the driving operation amount of the driver and to control the braking device so that a target braking force equal to the first vehicle longitudinal force is applied to at least one of the turning inner front and rear wheels.

According to the above aspect, when the first vehicle longitudinal force is greater than the second vehicle longitudinal force, the driving device is controlled so as to generate a driving force based on the driving operation amount of the driver and the braking device is controlled so that a target braking force equal to the first vehicle longitudinal force is applied to at least one of the turning inner front and rear wheels. Therefore, as will be described in detail later, a driving force of the entire vehicle is a value obtained by subtracting the first vehicle longitudinal force from the driving force based on the driving operation amount of the driver.

In contrast, a driving force of the entire vehicle in which the behavior control by the conventional behavior control apparatus is performed is a value obtained by subtracting the first vehicle longitudinal force and the second vehicle longitudinal force from the driving force based on the driving operation amount of the driver.

Thus, according to the above configuration, the driving force of the entire vehicle can be increased by the second vehicle longitudinal force. Therefore, as compared to the conventional behavior control apparatus, a reduction amount of the driving force of the entire vehicle due to the behavior control can be reduced, so that unnecessary deceleration of the vehicle can be prevented and the possibility that an occupant or occupants of the vehicle may feel uncomfortable due to deceleration can be reduced.

In another aspect of the present disclosure, the target driving force is a value obtained by adding the first vehicle longitudinal force to a value obtained by subtracting the second vehicle longitudinal force from a driving force based on the driving operation amount of the driver.

According to the above aspect, the target driving force is set to a value obtained by adding the first vehicle longitudinal force to a value obtained by subtracting the second vehicle longitudinal force from a driving force based on the driving operation amount of the driver. Accordingly, as compared to where the target driving force is a value obtained by adding a correction amount based on the first vehicle longitudinal force to a value obtained by subtracting the second vehicle longitudinal force from the driving force based on the driving operation amount of the driver, and a magnitude of the correction amount based on the first vehicle longitudinal force is smaller than a magnitude of the first vehicle longitudinal force, the braking force applied to at least one of the turning inner front and rear wheels can be increased. Therefore, as compared to where a correction amount based on the first vehicle longitudinal force is added, more stable behavior of the vehicle can effectively be secured, while reducing the possibility that an occupant of the vehicle feels uncomfortable due to unnecessary deceleration of the vehicle.

In another aspect of the present disclosure, the wheel to which the target braking force is applied is an inner wheel of driving wheels to which driving forces generated by the driving device are applied.

According to the above aspect, the target braking force is applied to an inner wheel of driving wheels to which driving forces generated by the driving device are applied. Therefore, as compared to where at least a part of the target braking force is applied to an inner one of the driven wheels, a braking slip of the wheel can be reduced, so that a possibility that stability of turning behavior of the vehicle deteriorates due to a braking slip of the wheel can be reduced.

In another aspect of the present disclosure, the control unit is configured to calculate the target yaw moment and the target deceleration based on a deviation between a normative yaw rate of the vehicle and an actual yaw rate of the vehicle.

According to the above aspect, the target yaw moment and the target deceleration are calculated based on a deviation between a normative yaw rate of the vehicle and an actual yaw rate of the vehicle. Therefore, turning behavior of the vehicle can be stabilized by a feedback control amount based on the yaw rate deviation.

Further, in another aspect of the present disclosure, the control unit is configured to calculate the target yaw moment as a sum of a first target yaw moment based on a deviation between a normative yaw rate of the vehicle and an actual yaw rate of the vehicle and a second target yaw moment for a turning control of the vehicle based on a lateral acceleration of the vehicle, and to calculate the target deceleration based on a deviation between a normative yaw rate of the vehicle and an actual yaw rate of the vehicle.

According to the above aspect, the target yaw moment is calculated as a sum of a first target yaw moment based on a deviation between a normative yaw rate of the vehicle and an actual yaw rate of the vehicle and a second target yaw moment for a turning control of the vehicle based on a lateral acceleration of the vehicle. Therefore, turning behavior of the vehicle can be stabilized by a feedback control amount based on the yaw rate deviation and a feedforward control amount based on the second target yaw moment.

Other objects, other features and attendant advantages of the present disclosure will be readily understood from the description of the embodiments of the present disclosure described with reference to the following drawings.

DETAILED DESCRIPTION

An embodiment of the present disclosure will now be described in detail with reference to the accompanying drawings.

Figure 1:
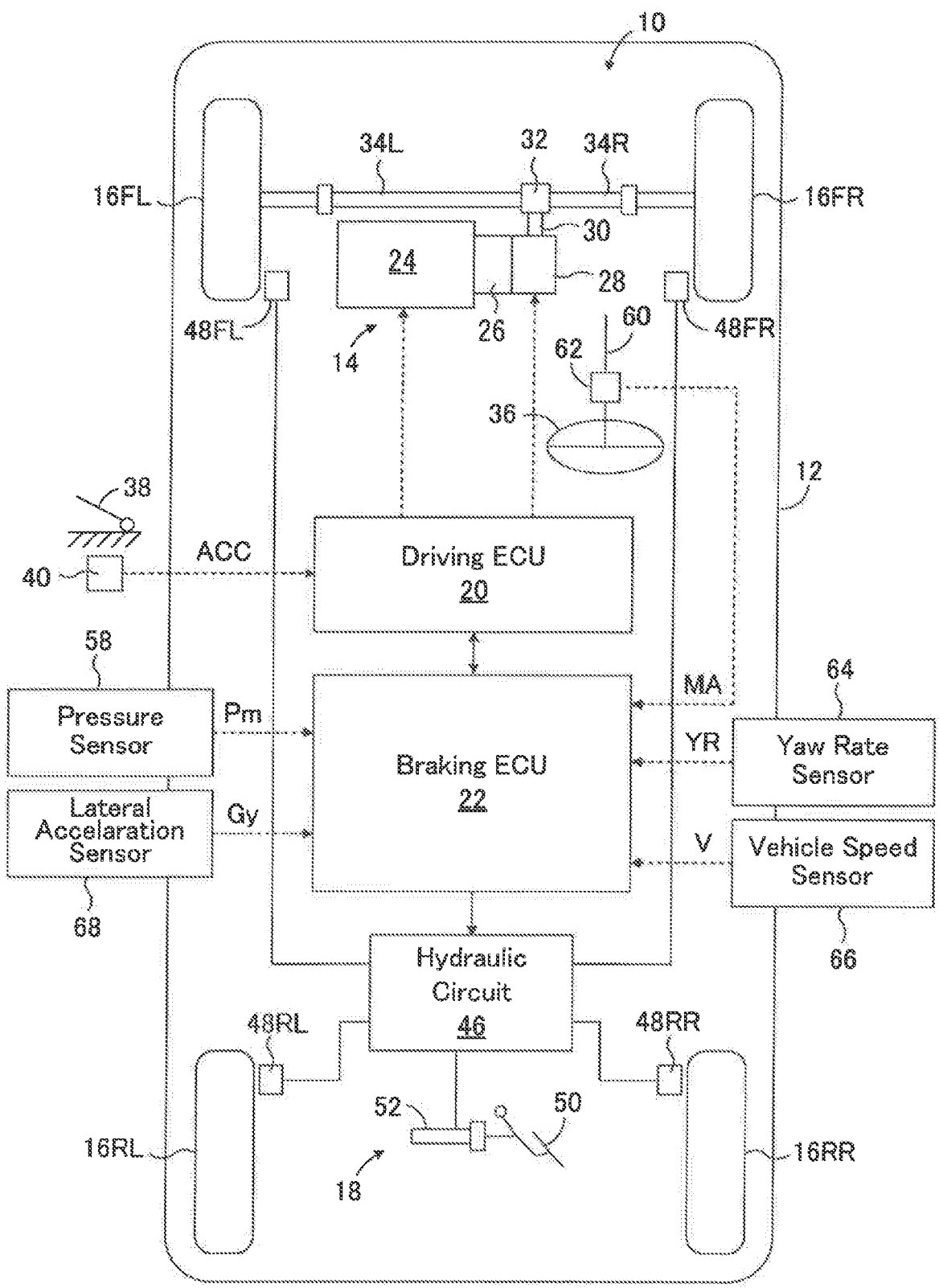
FIG. 1 is a schematic configuration diagram showing an embodiment of a vehicular behavior control apparatus according to the present disclosure.

As shown in FIG. 1, the behavior control apparatus 10 according to the embodiment of the present disclosure is applied to a vehicle 12 that is a front wheel drive vehicle. The vehicle 12 has a driving device 14 that generates a driving force for driving the vehicle and a braking device 18 that generates braking forces applied to wheels 16 FL. 16 FR, 16 RL and 16 RR. Further, the vehicle 12 includes a driving electronic control unit (hereinafter referred to as "driving ECU") 20 configured to control the driving device 14 based on an operation amount of a driver, and a braking electronic control device (hereinafter referred to as "braking ECU") 22 configured to control the braking device 18.

The driving device 14 includes an engine 24, a torque converter 26 and a transmission 28. Driving force of the engine 24 is transmitted to an output shaft 30 via the torque converter 26 and the transmission 28, and further transmitted to drive shafts 34 FL and 34 FR via a front wheel differential 32 so that the left and right front wheels 16 FL and 16 FR are rotationally driven. The left and right front wheels 16FL and 16FR are steered by a steering device (not shown) that is actuated in response to a rotational operation of a steering wheel 36 by the driver. Thus, the left and right front wheels 16FL and 16FR are driving wheels and steered wheels. On the other hand, the left and right rear wheels 16RL and 16RR are non-steered wheels as well as driven wheels.

As shown in FIG. 1, an accelerator opening degree ACC indicating a driving operation amount of the driver is detected by an accelerator opening degree sensor 40 provided on an accelerator pedal 38, and a signal indicating the accelerator opening degree ACC is input to the driving ECU 20. In the normal state, the driving ECU 20 controls the engine 24 and the transmission 28 based on the accelerator opening degree ACC, and thereby controls the driving force for driving the vehicle 12. The driving ECU 20 supplies a signal indicating the accelerator opening degree ACC to the braking ECU 22.

The braking device 18 includes a hydraulic circuit 46, wheel cylinders 48FR, 48FL, 48RR and 48RL provided in the wheels 16FL to 16RL, and a master cylinder 52 for pressure-feeding brake oil in response to a driver's depression of a brake pedal 50. Although not shown in detail in FIG. 1, the hydraulic circuit 46 includes a reservoir, an oil pump, various valve devices, and the like, and functions as a brake actuator.

A pressure sensor 58 for detecting a master cylinder pressure Pm is provided in the master cylinder 52, and a signal indicating a master cylinder pressure Pm detected by the pressure sensor 58 is input to the braking ECU 22. The braking ECU 22 controls braking pressures of the respective wheels, that is, pressures in the wheel cylinders 48FL to 48RR based on the master cylinder pressure Pm, so that braking forces of the respective wheels are controlled in accordance with a depression operation amount of the brake pedal 50, that is, according to the driver's braking operation amount. In addition, as will be described in detail later, the braking ECU 22 independently controls the braking forces of the respective wheels irrespective of the depression amount of the brake pedal 50 as necessary.

As shown in FIG. 1, a steering angle sensor 62 is provided on the steering shaft 60 integrally connected to the steering wheel 36 and detects a rotation angle of the shaft as a steering angle MA. The steering angle sensor 62 detects a steering angle MA with a steering angle corresponding to the straight travel of the vehicle 12 assuming 0 and a steering angle in the left turning direction and a steering angle in the right turning direction assuming positive and negative values, respectively.

Signals indicating a steering angle MA and an actual yaw rate YR of the vehicle 12 are input from the steering angle sensor 62 and a yaw rate sensor 64, respectively, to the braking ECU 22, and signals indicating a vehicle speed V and a lateral acceleration Gy of the vehicle are input to the braking ECU 22 from a vehicle speed sensor 66 and a lateral acceleration sensor 68, respectively. Similarly to the steering angle sensor 62, the yaw rate sensor 64 and the lateral acceleration sensor 68 detect an actual yaw rate YR and a lateral acceleration Gy, respectively, with a yaw rate and a lateral acceleration corresponding to the straight travel of the vehicle 12 assuming 0, and a yaw rate and a lateral acceleration in the left turning direction and the right turning direction assuming positive and negative, respectively.

The braking ECU 22 calculates a driver-requested longitudinal force Fdr on the basis of the accelerator opening degree ACC during non-braking, that is, when no braking operation is being performed by the driver. In addition, the braking ECU 22 calculates a target deceleration Gxt and a first target yaw moment My1 of the vehicle for reducing a degree of understeer of the vehicle as a feedback control amount for the yaw rate of the vehicle 12. Further, the braking ECU 22 calculates a second target yaw moment My2 of the vehicle as a feed forward control amount for improving a turning performance of the vehicle.

The braking ECU 22 calculates a guard processed second target yaw moment My2g that is derived by guard processing the second target yaw moment My2 so that the latter does not become excessive. The braking ECU 22 calculates a target yaw moment Myt of the vehicle as a sum Myt1+My2g of the first target yaw moment Myt1 and the guard processed second target yaw moment My2g. Further, as will be described in detail later, the braking ECU 22 cooperates with the driving ECU 20 to drive the vehicle 12 secures proper turning behavior of the vehicle without unnecessarily decelerating the vehicle 12 based on the driver-requested longitudinal force Fdr, the target deceleration Gxt of the vehicle and the target yaw moment Myt of the vehicle. Therefore, the driving ECU 20 and the braking ECU 22 cooperate with each other to function as a control unit that performs a behavior control for securing proper turning behavior of the vehicle during non-braking turning by controlling the driving device 14 and the braking device 18, respectively.

Although not shown in detail in FIG. 1, the driving ECU 20 and the braking ECU 22 each include a microcomputer and a drive circuit, and exchange necessary information with each other via CAN, for example. Each microcomputer has a general configuration in which a CPU, a ROM, a RAM, and an input/output port device are provided and mutually connected by a bidirectional common bus. In particular, the ROM of the microcomputer of the braking ECU 22 stores control programs corresponding to the flow charts shown in FIGS. 2 and 3 to be described later and maps shown in FIGS. 4 and 5, and the CPU performs the behavior control by executing the control program.

Figure 2:
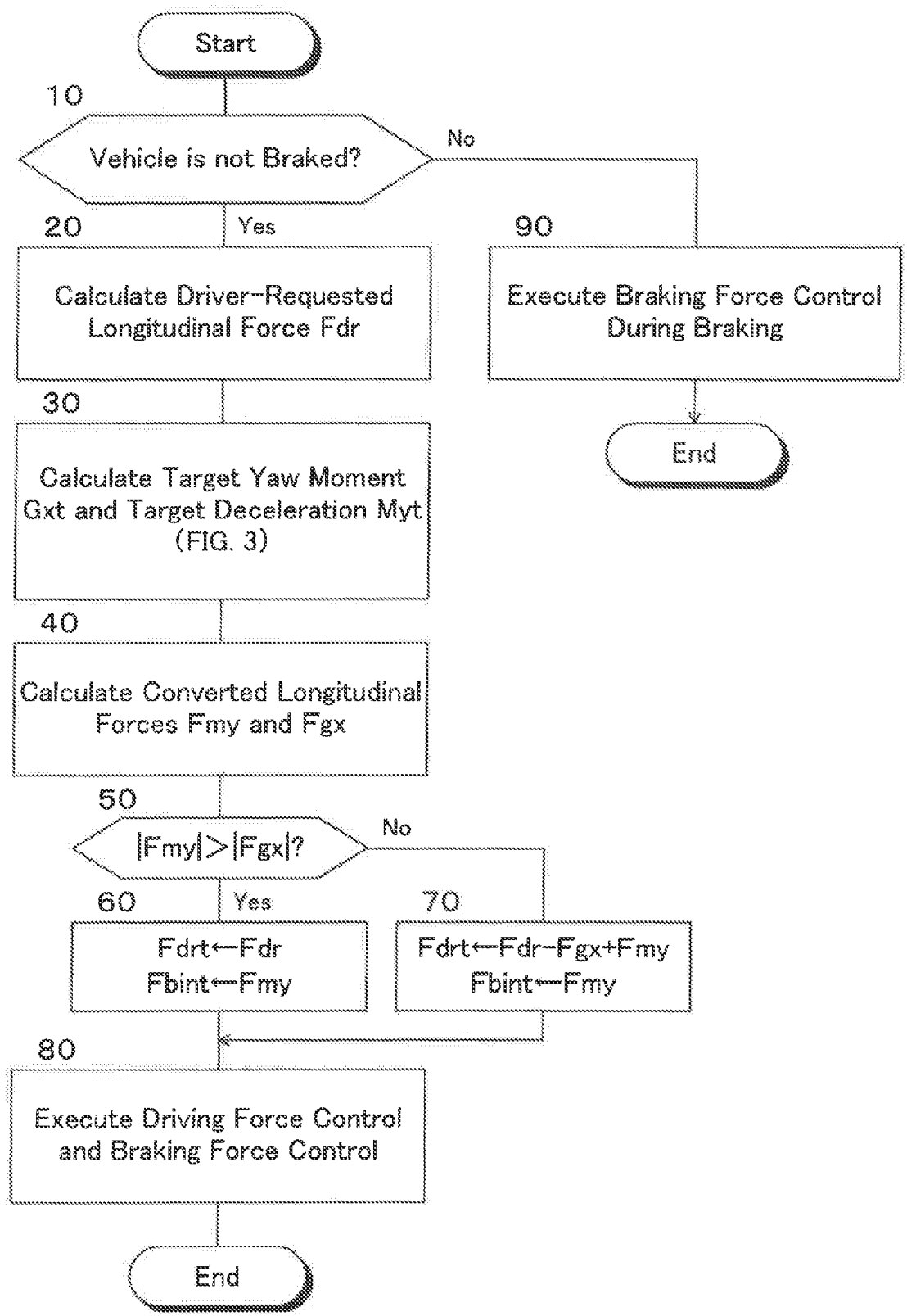
FIG. 2 is a flowchart showing a main routine of behavior control in the embodiment.

Next, the main routine of the behavior control in the embodiment will be described with reference to the flowchart shown in FIG. 2. The behavior control according to the flowchart shown in FIG. 2 is repeatedly executed at predetermined time intervals when an ignition switch (not shown) is ON.

First, in step 10, for example, by determining whether a master cylinder pressure Pm detected by the pressure sensor 58 is equal to or less than a reference value (a positive constant), it is determined whether or not the vehicle is not braked, that is, whether or not no braking operation is performed by a driver. When a negative determination is made, the behavior control proceeds to step 90, and when an affirmative determination is made, the behavior control proceeds to step 20. Notably, prior to execution of step 10, reading of a steering angle MA detected by the steering angle sensor 62 and the likes is performed.

In step 20, a driver-requested longitudinal force Fdr is calculated based on an accelerator opening degree ACC. Incidentally, the driver-requested longitudinal force Fdr is a force for driving the vehicle, and is calculated as a value that is, for example, in proportion to the accelerator opening degree ACC and assumes positive when it is in the forward direction of the vehicle.

Figure 3:
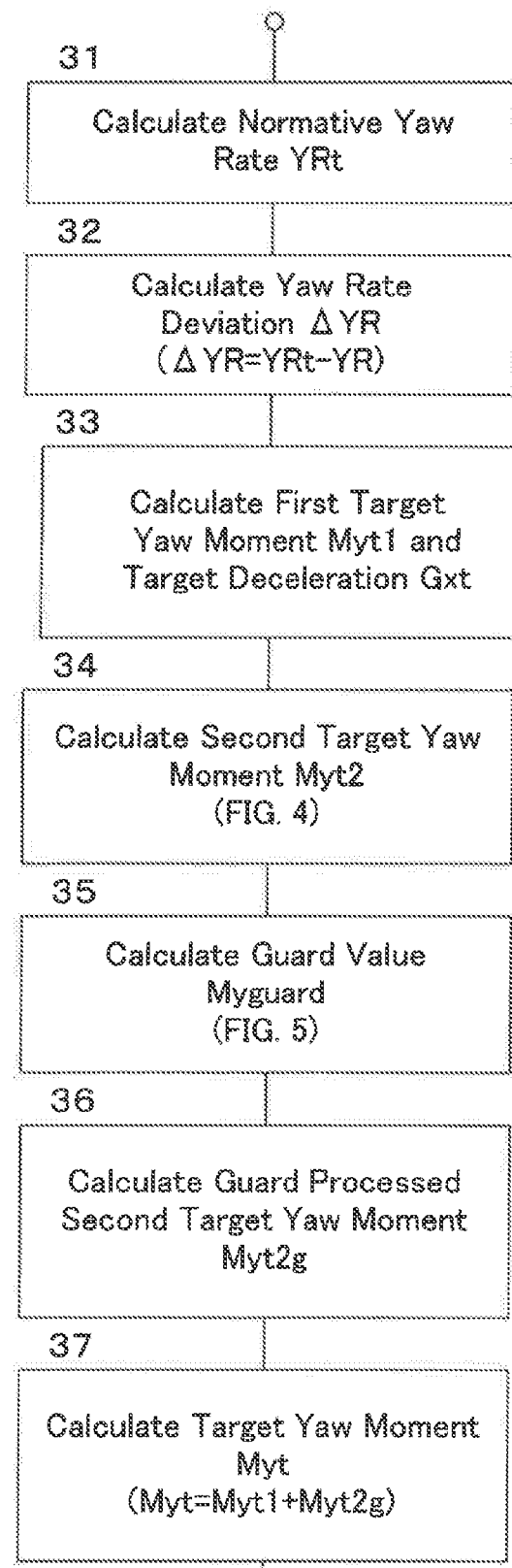
FIG. 3 is a flowchart showing a subroutine for calculating a target yaw moment Myt of the vehicle and a target deceleration Gxt of the vehicle executed in step 30 of FIG. 2.

In step 30, a target yaw moment Myt of the vehicle 12 and a target deceleration Gxt of the vehicle are calculated in order to ensure proper turning behavior of the vehicle 12 in accordance with the subroutine shown in FIG. 3.

In step 40, converted longitudinal forces Fmy and Fgx are calculated as longitudinal forces of the vehicle required to achieve the target yaw moment Myt and the target deceleration Gxt, respectively, according to the following equations (1) and (2). The converted longitudinal force Fmy is a sum of braking forces to be applied to inner front and rear wheels in order to achieve the target yaw moment Myt, and the converted longitudinal force Fgx is a braking force to be applied to the vehicle in order to achieve the target deceleration Gxt.

$$Fmy=|Myt|/(Tr/2) \quad (1)$$

$$Fgx=Mv \cdot Gxt \quad (2)$$

In the above equation (1), Tr is a tread of the vehicle 12, and in the above equation (2), Mv is a mass of the vehicle. The mass Mv may be a preset positive constant, or may variably be set based on a weight of the vehicle estimated in a manner known in the art.

In step 50, it is determined whether or not an absolute value of the converted longitudinal force Fmy is larger than an absolute value of the converted longitudinal force Fgx, that is, whether or not a braking force required to achieve the target yaw moment Myt is greater than a braking force required to achieve the target deceleration Gxt. When a negative determination is made, the behavior control proceeds to step 70, and when an affirmative determination is made, the behavior control proceeds to step 60.

In step 60, a target driving force Fdrt of the vehicle is set to the driver-requested longitudinal force Fdr, and a target braking force Fbint to be applied to the turning inner front and rear wheels is set to the converted longitudinal force Fmy.

In step 70, a target driving force Fdrt of the vehicle is calculated according to the following equation (3), and a target braking force Fbint to be applied to the turning inner front and rear wheels is set to the converted longitudinal force Fmy.

$$Fdrt=Fdr-Fgx+Fmy \quad (3)$$

In step 80, the engine 24 and the transmission 28 are controlled so that a driving force of the vehicle becomes the target driving force Fdrt, thereby driving forces of the left and right front wheels 16FL and 16FR are controlled to be Fdrt/2. Further, a turning direction of the vehicle 12 is determined on the basis of an actual yaw rate YR of the vehicle, for example, and a braking force applied to the turning inner front wheel is controlled to be the target braking force Fbint (=Fmy).

In step 90, braking pressures of the wheels are controlled based on a master cylinder pressure Pm detected by the pressure sensor 58, so that the braking forces of the wheels become the braking forces corresponding to the master cylinder pressure Pm. Even when a braking operation is being performed by the driver, a behavior control during braking may be performed in any manner known in the art.

Next, referring to FIG. 3, the calculations of the target yaw moment Myt of the vehicle and the target deceleration Gxt of the vehicle executed in step 30 will be described.

First, in step 31, a normative yaw rate YRt of the vehicle 12 is calculated based on a steering angle MA and a vehicle speed V in a manner known in the art.

In step 32, a yaw rate deviation ΔYR is calculated as a deviation YRt-YR between the normative yaw rate YRt and an actual yaw rate YR of the vehicle 12 detected by the yaw rate sensor 64.

In step 33, a first target yaw moment Myt1 of the feedback control and a target deceleration Gxt of the vehicle for reducing a degree of understeering of the vehicle 12 by reducing an absolute value of the yaw rate deviation ΔYR are calculated on the basis of the yaw rate deviation ΔYR in a manner known in the art.

Notably, when the absolute value of the yaw rate deviation ΔYR is equal to or smaller than a control start reference value ΔYR1 (a positive constant), since it is unnecessary to control braking forces of the wheels by the behavior control, the first target yaw moment Myt1 and the target deceleration Gxt are calculated to 0. When the absolute value of the yaw rate deviation ΔYR exceeds the control start reference value ΔYR1 and subsequently becomes equal to or less than a control termination reference value ΔYR2 (a positive constant smaller than ΔYR1), the first target yaw moment Myt1 and the target deceleration Gxt are calculated to 0. Further, when a magnitude of an actual yaw rate YR is larger than a magnitude of the normative yaw rate YRt, that is, when the vehicle is in an oversteer state, although not shown in the drawing, an oversteer control for applying a braking force to at least turning outer front wheel may be performed.

Figure 4:
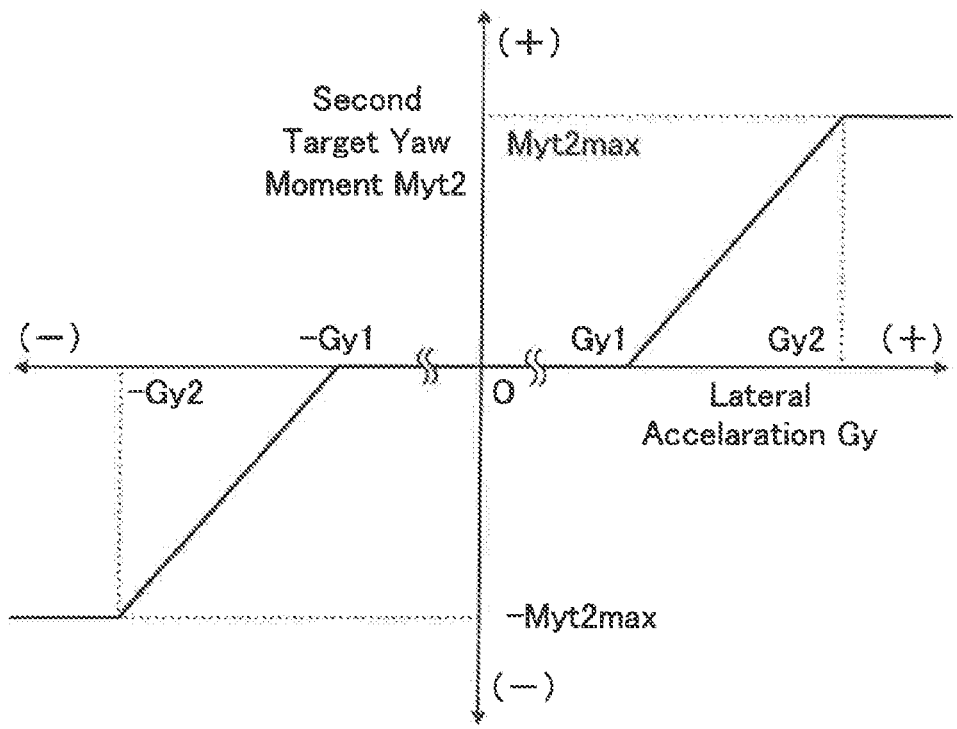
FIG. 4 is a diagram showing a map for calculating a second target yaw moment Myt2 based on a lateral acceleration Gy of the vehicle.

In step 34, the map indicated by the solid line in FIG. 4 is referred to based on a lateral acceleration Gy of the vehicle 12 detected by the lateral acceleration sensor 68, whereby a second target yaw moment Myt2 is calculated. The second target yaw moment Myt2 is a target yaw moment of the feed forward control for reducing a rate of decrease of the yaw gain ∂YR/∂MA of the vehicle due to an increase in an absolute value of the lateral acceleration Gy of the vehicle. The map shown in FIG. 4 is obtained in advance for each type of vehicle as a turn assist yaw moment for reducing a possibility that the vehicle falls in an understeer state, and is stored in the ROM.

As shown in FIG. 4, an absolute value of the second target yaw moment Myt2 is 0 when an absolute value of the lateral acceleration Gy is not more than a first reference value Gy1 (a positive constant), and is a maximum value Myt2max (a positive constant) when the absolute value of the lateral acceleration Gy is equal to or larger than a second reference value Gy2 that is larger than the first reference value Gy1. Further, when the absolute value of the lateral acceleration Gy is larger than the first reference value Gy1 and smaller than the second reference value Gy2, the absolute value of the second target yaw moment Myt2 is larger as the absolute value of the lateral acceleration Gy is larger.

Figure 5:
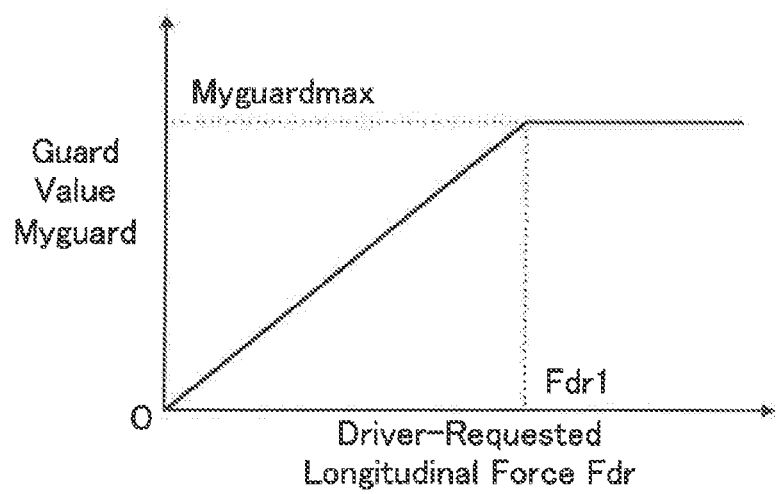
FIG. 5 is a diagram showing a map for calculating a guard value Myguard based on a driver-requested longitudinal force Fdr.

In step 35, a guard value Myguard is calculated by referring to the map shown in FIG. 5 based on a driver-requested longitudinal force Fdr calculated in step 20. The map shown in FIG. 5 is a map of a guard value for limiting the second target yaw moment Myt 2 so as to prevent a lateral force of the inner front wheel from decreasing due to the braking force applied to the inner front wheel in order to reduce a degree of understeer of the vehicle. This map is obtained in advance for each type of vehicle and stored in the ROM. Furthermore, the guard value Myguard may be calculated based on an accelerator opening degree ACC so that the smaller an accelerator opening degree ACC indicating a driving operation amount of the driver is, the smaller the guard value Myguard becomes.

As shown in FIG. 5, the guard value Myguard is 0 when a driver-requested longitudinal force Fdr is 0, and becomes a maximum value Myguardmax (a positive constant) when the driver-requested longitudinal force Fdr is greater than or equal to a reference value Fdr1 (a positive constant). Further, the guard value Myguard increases as the driver-requested longitudinal force Fdr increases when the driver-requested longitudinal force Fdr is larger than 0 and smaller than the reference value Fdr1.

In step 36, the second target yaw moment Myt2 is guarded with the guard value Myguard so that an absolute value of the second target yaw moment Myt2 does not exceed the guard value Myguard, whereby a guard processed second target yaw moment Myt2g is calculated.

In step 37, a target yaw moment Myt is calculated as a sum Myt1+Myt2g of the first target yaw moment Myt1 calculated in step 33 and the guard processed second target yaw moment Myt2g calculated in step 36.

Operation of Embodiment

As understood from the above explanation, when the vehicle 12 is not braked, an affirmative determination is made in step 10 and steps 20 to 80 are executed, whereby the behavior control of the vehicle during non-braking turning is performed. That is, in step 20, a driver-requested longitudinal force Fdr is calculated based on an accelerator opening ACC, and in step 30, a target yaw moment Myt of the vehicle 12 and a target deceleration Gxt of the vehicle for securing proper turning behavior of the vehicle are calculated. Further, in step 40, converted longitudinal forces Fmy and Fgx are calculated as longitudinal forces of the vehicle required to achieve the target yaw moment Myt and the target deceleration Gxt, respectively.

<A. When a Magnitude of the Converted Longitudinal Force Fmy is Larger than a Magnitude of the Converted Longitudinal Force Fgx>

Figure 6:
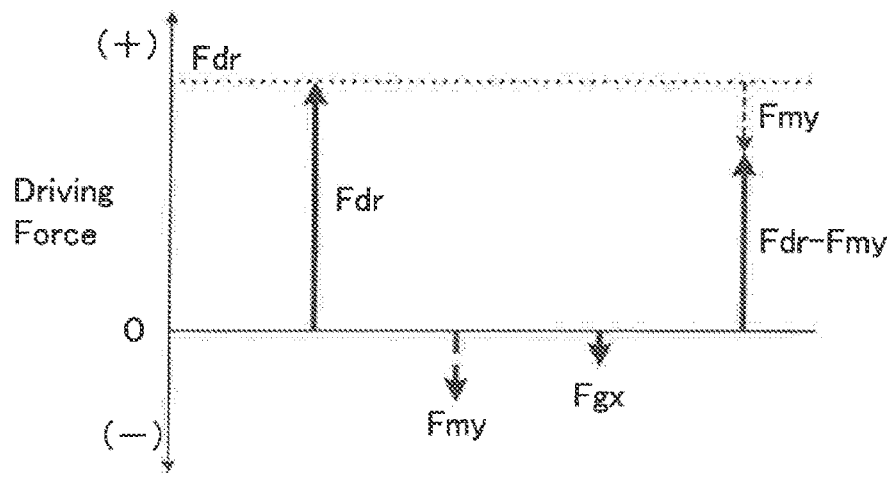
FIG. 6 is a diagram showing magnitude relationships between the driver-requested longitudinal force Fdr and converted longitudinal forces Fgx and Fmy for a situation where the converted longitudinal force Fmy is larger than the converted longitudinal force Fgx.

This is the case where, as shown in FIG. 6, a magnitude of the converted longitudinal force Fmy which is a longitudinal force of the vehicle required to achieve the target yaw moment Myt, is larger than a magnitude of the converted longitudinal force Fgx which is a longitudinal force of the vehicle required to achieve the target deceleration Gxt. It is to be noted that in FIG. 6 and FIGS. 7 to 11 to be described later, "+" means a driving force in the forward direction and "−" means a driving force in the backward direction, that is, a braking force.

Figure 7:
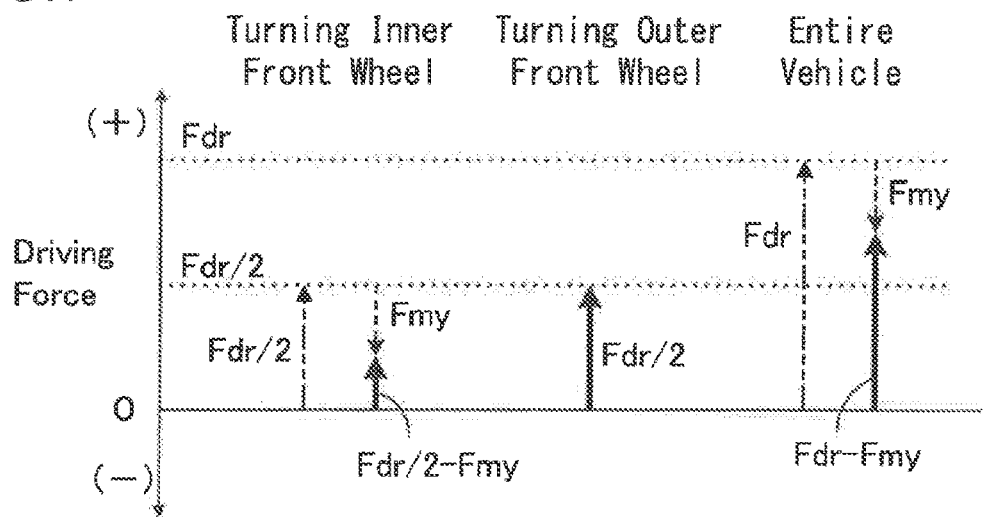
FIG. 7 is a diagram showing driving forces of a turning inner front wheel, a turning outer front wheel and the entire vehicle in the embodiment for the situation shown in FIG. 6.

Since a affirmative determination is made in step 50, in step 60, a target driving force Fdrt of the vehicle is set to a driver-requested longitudinal force Fdr, and a target braking force Fbint to be applied to the turning inner front and rear wheels is set to the converted longitudinal force Fmy. Further, in step 80, a driving force of the driving device 14 is controlled to be Fdrt, so that driving forces of the left and right front wheels 16FL and 16FR become Fdrt/2 as shown in FIG. 7, and a braking force corresponding to the converted longitudinal force Fmy is imparted to the turning inner front wheel. Therefore, a driving force of the entire vehicle is is a sum of a driving force Fdrt/2−Fmy of the inner front wheel and a driving force Fdrt/2 of the turning outer front wheel, that is, Fdrt−Fmy.

Figure 8:
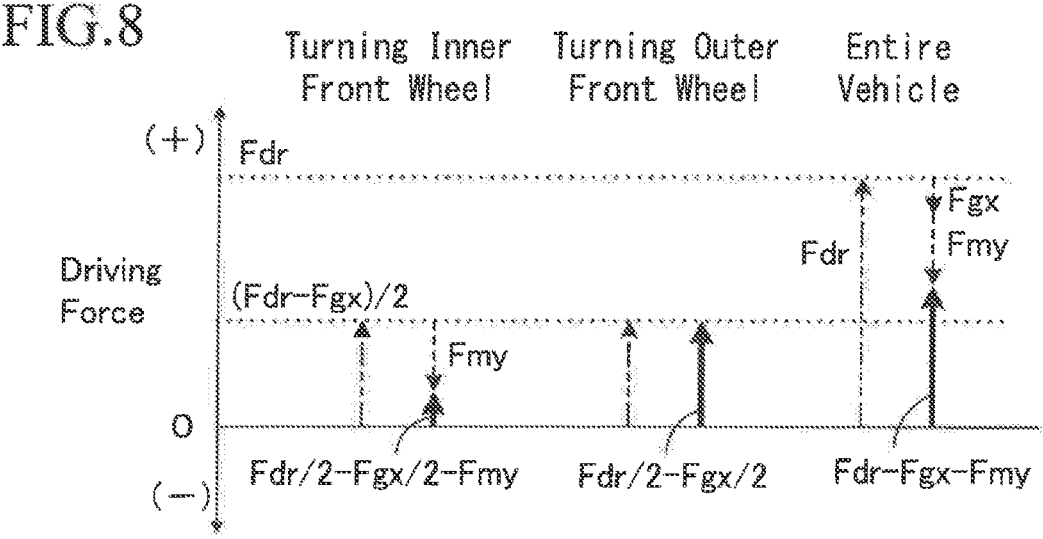
FIG. 8 is a diagram showing driving forces of a turning inner front wheel, a turning outer front wheel and the entire vehicle in a prior art for the situation shown in FIG. 6.

In contrast, in the case of a conventional behavior control apparatus, as shown in FIG. 8, the driving forces of the left and right front wheels 16FL and 16FR are controlled so as to be Fdrt/2−Fgx/2, respectively, and a braking force corresponding to the converted longitudinal force Fmy is applied to the turning inner front wheel. Therefore, a driving force of the entire vehicle is a sum of the driving force Fdrt/2−Fgx/2−Fmy of the turning inner front wheel and the driving force Fdrt/2−Fgx/2 of the turning outer front wheel, that is, Fdrt−Fgx−Fmy.

Thus, according to the embodiment, as compared to the conventional behavior control apparatus, the driving force of the entire vehicle can be increased by the magnitude of the converted longitudinal force Fgx. Therefore, when the behavior control of the vehicle during non-braking turning is performed, and the magnitude of the converted longitudinal force Fmy is larger than the magnitude of the converted longitudinal force Fgx, the deceleration of the vehicle can be reduced by Fgx/Mv.

Since the magnitude of the converted longitudinal force Fmy is larger than the magnitude of the converted longitudinal force Fgx, a braking force corresponding to the converted longitudinal force Fmy is applied to the turning inner front wheel, whereby a braking force greater than the converted longitudinal force Fgx is imparted to the vehicle. Therefore, according to the embodiment, although the converted longitudinal force Fgx is not given to the vehicle, by applying the braking force corresponding to the converted longitudinal force Fmy to the turning inner front wheel, it is possible to obtain the same effect as in the case where the converted longitudinal force Fgx is given to the vehicle.

<B. When the Magnitude of the Converted Longitudinal Force Fmy is Equal to or Less than the Magnitude of the Converted Longitudinal Force Fgx>

Figure 9:
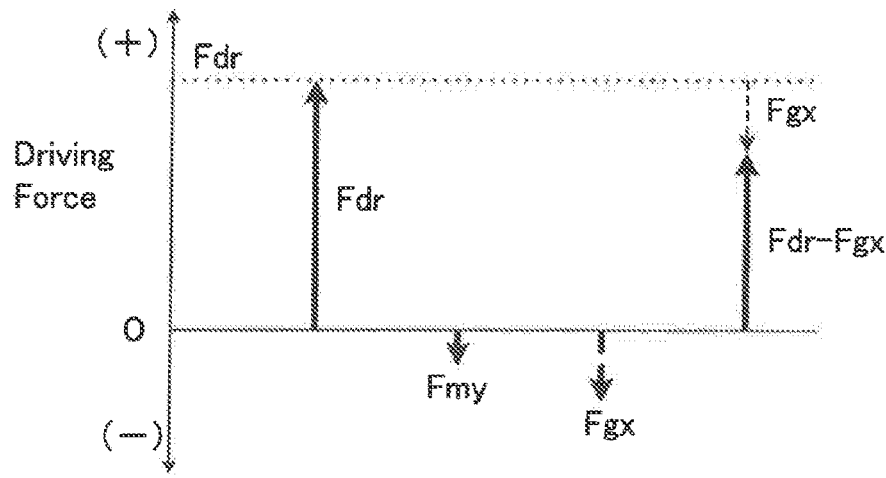
FIG. 9 is a diagram showing magnitude relationships between the driver-requested longitudinal force Fdr and converted longitudinal forces Fgx and Fmy for a situation where the converted longitudinal force Fmy is equal to or smaller than the converted longitudinal force Fgx.
Figure 10:
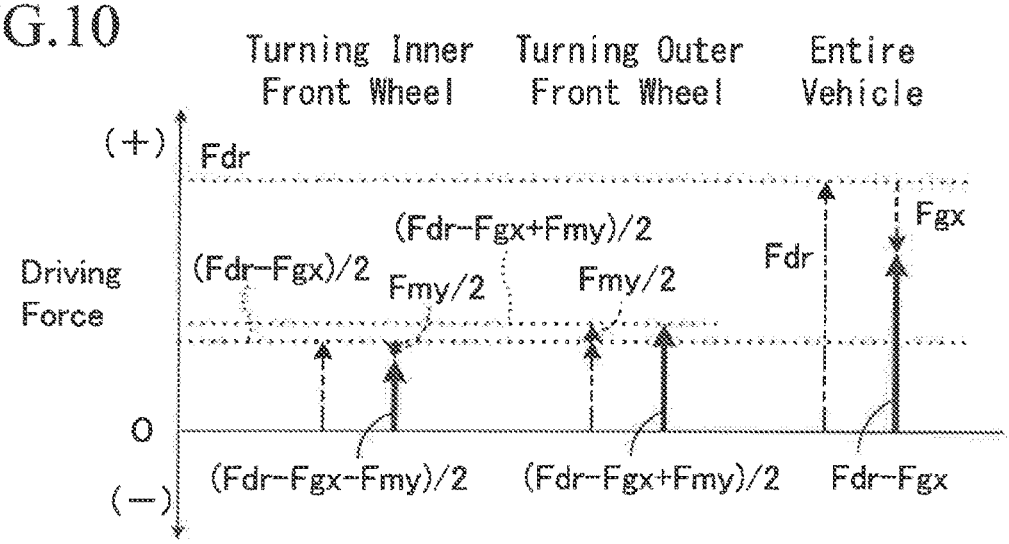
FIG. 10 is a diagram showing driving forces of a turning inner front wheel, a turning outer front wheel and the entire vehicle in the embodiment for the situation shown in FIG. 9.

This is a case where, as shown in FIG. 9, the converted longitudinal force Fmy which is the longitudinal force of the vehicle required to achieve the target yaw moment Myt, is larger than the longitudinal force Fmy which is a longitudinal force required to achieve the target deceleration Gxt Is equal to or less than the converted longitudinal force Fgx.

In step 50, a negative determination is made. In step 70, a target driving force Fdrt of the vehicle is calculated as Fdr−Fgx+Fmy, and a target braking force Fbint to be applied to the turning inner front and rear wheels is set to the converted longitudinal force Fmy. Further, in step 80, a driving force of the driving device 14 is controlled to be Fdr−Fgx+Fmy, whereby driving forces of the left and right front wheels 16FL and 16FR are controlled to be (Fdr−Fgx+Fmy)/2, and a braking force corresponding to the converted longitudinal force Fmy/2 is imparted to the turning inner front wheel. Therefore, the driving force of the entire vehicle is a sum of the driving force (Fdr−Fgx−Fmy)/2 of the turning inner front wheel and the driving force (Fdr−Fgx+Fmy)/2 of the turning outer front wheel, that is, Fdrt−Fgx.

Figure 11:
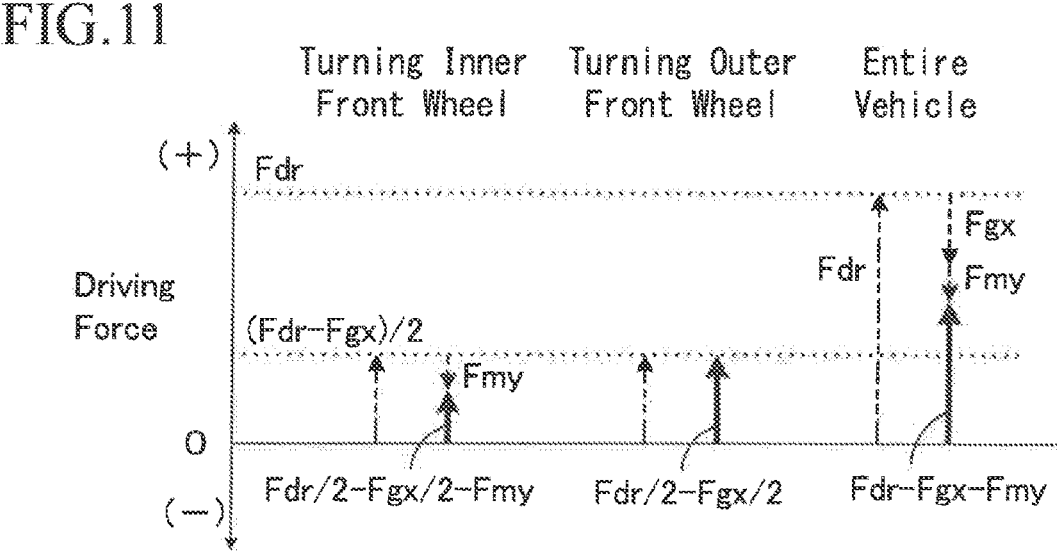
FIG. 11 is a diagram showing driving forces of a turning inner front wheel, a turning outer front wheel and the entire vehicle in a prior art for the situation shown in FIG. 9.

Although magnitudes of the converted longitudinal force Fgx and the converted longitudinal force Fmy are different from those in the above case A, as shown in FIG. 11, the driving force of the entire vehicle in the conventional behavior control apparatus is Fdrt−Fgx−Fmy, as in the above case A. Thus, according to the embodiment, as compared to the conventional behavior control apparatus, the driving force of the entire vehicle can be increased by a magnitude of the converted longitudinal force Fmy. Therefore, when the behavior control of the vehicle during non-braking is performed and the magnitude of the converted longitudinal force Fmy is equal to or less than the magnitude of the converted longitudinal force Fgx, a deceleration of the vehicle can be reduced by Fmy/Mv.

As described above, according to the embodiment, in either of the cases A and B described above, it is possible to prevent an unnecessary braking force from being applied to the vehicle due to the behavior control of the vehicle during non-braking turning and to prevent an occupant of the vehicle from feeling discomfort due to unnecessary deceleration of the vehicle.

According to the embodiment, in either of the cases A and B, no driving force other than a driving force corresponding to one-half of the driver-requested longitudinal force Fdr is imparted to the turning outer front wheel. Therefore, the fuel consumption is not deteriorated due to the application of the driving force, and a device for variably controlling the right and left distribution of the driving force generated by the driving device is unnecessary.

In particular, according to the embodiment, in either of the cases A and B, a wheel to which the braking force corresponding to the converted longitudinal force Fmy is applied is the turning inner front wheel which is the turning inner driving wheel. Since the driving force is applied to the turning inner front wheel, even if the braking force corresponding to the converted longitudinal force Fmy is a high value, a possibility that a braking slip of the wheel becomes excessive is far smaller than in the case where the braking force is applied to the turning inner rear wheel which is the turning inner driven wheel. Therefore, it is possible to avoid deterioration of the stability during turning of the vehicle caused by excessive braking slip of the wheel.

The target yaw moment Myt calculated in step 30 is a sum of the first target yaw moment Myt1 and the guard processed second target yaw moment Myt2g. The first target yaw moment Myt1 is a turning assist yaw moment of the feedback control for reducing a degree of understeer of the vehicle based on a yaw rate deviation ΔYR. The guard processed second target yaw moment Myt2g is a value obtained by guarding a second target yaw moment Myt2 which is a turning assist yaw moment of the feed forward control for reducing a degree of understeer of the vehicle with a guard value Myguard.

Therefore, according to the embodiment, even when the absolute value of the yaw rate deviation ΔYR is equal to or less than the control start reference value ΔYR1, when an absolute value of the lateral acceleration Gy is larger than the first reference value Gy1, a turning assist yaw moment corresponding to the guard processed second target yaw moment Myt2g can be given to the vehicle. Therefore, as compared to where the target yaw moment Myt does not include the guard processed second target yaw moment Myt2g, the understeer prevention control during turning of the vehicle can be started without delay so that a possibility of the turning behavior of the vehicle becoming understeer can be effectively reduced.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above-described embodiment, although the vehicle 12 is a front wheel drive vehicle, the behavior control apparatus 10 of the present disclosure may be applied to a rear wheel drive vehicle or a four wheel drive vehicle. In the case where the vehicle is a rear wheel drive vehicle, since rear wheels are drive wheels, a braking force corresponding to the target braking force Fbint may be controlled to be imparted to a turning inner rear wheel. When the vehicle is a four wheel drive vehicle, since all the wheels are drive wheels, a braking force corresponding to the target braking force Fbint may be controlled to be distributed to and applied to a turning inner front wheel and a turning inner rear wheel.

In the above-described embodiment, when a magnitude of the converted longitudinal force Fmy is equal to or less than a magnitude of the converted longitudinal force Fgx, a target driving force Fdrt of the vehicle is calculated in accordance with the above equation (3) in step 70. In other words, a target driving force Fdrt is calculated as a value obtained by subtracting a converted longitudinal force Fgx required to achieve a target deceleration Gxt of the vehicle from a driver-requested longitudinal force Fdr, and adding a longitudinal force Fmy necessary for achieving a target yaw moment Myt of the vehicle.

However, a target driving force Fdrt may be calculated by subtracting a converted longitudinal force Fgx from a driver-requested longitudinal force Fdr and adding a product K·Fmy of a coefficient K and a converted longitudinal force Fmy according to the following equation (4) where K is a positive fixed coefficient larger than 0 and smaller than 1. In that case, the driving force of the entire vehicle can be increased by a value of the product K·Fmy, as compared to the conventional behavior control apparatus. Therefore, the deceleration of the vehicle can be reduced by K Fmy/Mv when the behavior control of the vehicle at the time of non-braking is performed and the magnitude of the converted longitudinal force Fmy is equal to or smaller than the magnitude of the converted longitudinal force Fgx.

$$Fdrt=Fdr-Fgx+K\cdot Fmy \qquad (4)$$

According to the above-described embodiment, it is possible to increase a braking force applied to the turning inner front wheel as compared with the modification example described above. Therefore, as compared to the modified example, more stable behavior of the vehicle can effectively be ensured, while reducing a possibility that an occupant of the vehicle may feel uncomfortable due to an unnecessary deceleration of the vehicle.

In the above-described embodiment, in step 33, a first target yaw moment Myt1 of feedback control for reducing a degree of understeer of the vehicle 12 by reducing an absolute value of the yaw rate deviation ΔYR is calculated. In step 34, a second target yaw moment Myt2, which is a target yaw moment of the feedforward control for reducing a reduction ratio of the yaw gain of the vehicle accompanying an increase of an absolute value of a lateral acceleration Gy of the vehicle, is calculated. Further, in steps 35 to 37, a target yaw moment Myt is calculated as a sum Myt1+Myt2g of a first target yaw moment Myt1 and a second target yaw moment Myt2g guarded by a guard value Myguard.

However, the calculation of the second target yaw moment Myt2 may be omitted, and the target yaw moment Myt may be set as the first target yaw moment Myt1. In that case, although the turning performance of the vehicle cannot be improved by a second target yaw moment Myt2, the turning performance can be improved by the target deceleration Gxt of the vehicle and the first target yaw moment My1.

Further, in the above-described embodiment, in step 35, a guard value Myguard is calculated, and in step 36, the second target yaw moment Myt2 is guarded with the guard value Myguard, whereby the guard processed second target yaw moment Myt2g is calculated. However, the guard value Myguard may be a preset constant, and further, the guard processing by the guard value Myguard may be omitted.

What is claimed is:

1. A vehicular behavior control apparatus that is configured to control behavior of a vehicle having a driving device that generates a driving force for driving the vehicle, a braking device that generates a braking force applied to each wheel, and a control unit that controls the driving device based on a driving operation amount of a driver and controls the braking device based on a braking operation amount of the driver, wherein the control unit is configured to calculate a target yaw moment of the vehicle and a target deceleration of the vehicle that are necessary for securing stable behavior of the vehicle during non-braking turning, to calculate a first vehicle longitudinal force generated by a braking force applied to at least one of the turning inner front and rear wheels to achieve the target yaw moment, to calculate a second vehicle longitudinal force required to achieve the target deceleration, and to control, when it is determined that the first vehicle longitudinal force is less than or equal to the second vehicle longitudinal force, the driving device so as to generate a target driving force equal to a value obtained by adding a correction amount based on the first vehicle longitudinal force to a value obtained by subtracting the second vehicle longitudinal force from a driving force based on the driving operation amount of the driver.

2. The vehicular behavior control apparatus according to claim 1, wherein the control unit is configured to control, when it is determined that the first vehicle longitudinal force is greater than the second vehicle longitudinal force, the driving device so as to generate a driving force based on the driving operation amount of the driver and to control the braking device so that a target braking force equal to the first vehicle longitudinal force is applied to at least one of the turning inner front and rear wheels.

3. The vehicular behavior control apparatus according to claim 1, wherein the target driving force is a value obtained by adding the first vehicle longitudinal force to a value obtained by subtracting the second vehicle longitudinal force from a driving force based on the driving operation amount of the driver.

4. The vehicular behavior control apparatus according to claim 1, wherein the wheel to which the target braking force is applied is an inner wheel of driving wheels to which driving forces generated by the driving device are applied.

5. The vehicular behavior control apparatus according to claim 1, wherein the control unit is configured to calculate the target yaw moment and the target deceleration based on a deviation between a normative yaw rate of the vehicle and an actual yaw rate of the vehicle.

6. The vehicular behavior control apparatus according to claim 1, wherein the control unit is configured to calculate the target yaw moment as a sum of a first target yaw moment based on a deviation between a normative yaw rate of the vehicle and an actual yaw rate of the vehicle and a second target yaw moment for a turning control of the vehicle based on a lateral acceleration of the vehicle, and to calculate the target deceleration based on a deviation between a normative yaw rate of the vehicle and an actual yaw rate of the vehicle.

* * * * *